United States Patent
Schroeder

(10) Patent No.: US 12,514,139 B2
(45) Date of Patent: Jan. 6, 2026

(54) SYSTEMS AND METHODS FOR MONITORING DISC CONDITIONS OF AGRICULTURAL IMPLEMENTS BASED ON MONITORED SUB-SURFACE DENSITY PROFILES

(71) Applicant: CNH Industrial America LLC, New Holland, PA (US)

(72) Inventor: Brittany Schroeder, Lowell, IN (US)

(73) Assignee: CNH Industrial America LLC, New Holland, PA (US)

( * ) Notice: Subject to any disclaimer, the term of this patent is extended or adjusted under 35 U.S.C. 154(b) by 470 days.

(21) Appl. No.: 17/828,213

(22) Filed: May 31, 2022

(65) Prior Publication Data
US 2023/0380318 A1    Nov. 30, 2023

(51) Int. Cl.
*A01B 33/12* (2006.01)
*A01B 33/16* (2006.01)

(52) U.S. Cl.
CPC .............. *A01B 33/12* (2013.01); *A01B 33/16* (2013.01)

(58) Field of Classification Search
CPC .................................. A01B 33/12; A01B 33/16
See application file for complete search history.

(56) References Cited

U.S. PATENT DOCUMENTS

| | | | |
|---|---|---|---|
| 9,265,192 B2 | 2/2016 | Chan et al. | |
| 2017/0067869 A1* | 3/2017 | Lund | G01N 33/246 |
| 2020/0404830 A1* | 12/2020 | Ferrari | G01S 13/42 |
| 2020/0404833 A1* | 12/2020 | Stanhope | A01C 5/066 |
| 2021/0007266 A1 | 1/2021 | Stoller et al. | |
| 2021/0132028 A1 | 5/2021 | Foster et al. | |
| 2021/0195821 A1 | 7/2021 | Knobloch | |
| 2023/0309437 A1* | 10/2023 | Palla | A01B 79/005 |
| | | | 701/50 |

* cited by examiner

*Primary Examiner* — Adnan M Mirza
(74) *Attorney, Agent, or Firm* — Dority & Manning, P.A.

(57) ABSTRACT

In one aspect, a system for monitoring disc conditions of an agricultural implement. The system includes a plurality of discs configured to penetrate through a soil surface during the performance of an agricultural operation, and a sub-surface density sensor configured to generate data associated with a density of one or more sub-surface features included within a lateral section of a field. The lateral section encompasses an expected location of a sub-surface portion of each disc of the discs. The system also includes a computing system communicatively coupled with the sub-surface density sensor. The computing system is configured to determine a sub-surface density profile extending across the lateral section of the field based on the data received from the sub-surface density sensor, and determine an operating condition of at least one disc of the plurality of discs based at least in part on the sub-surface density profile.

18 Claims, 6 Drawing Sheets

SYSTEMS AND METHODS FOR MONITORING DISC CONDITIONS OF AGRICULTURAL IMPLEMENTS BASED ON MONITORED SUB-SURFACE DENSITY PROFILES

FIELD OF THE INVENTION

The present disclosure generally relates to agricultural implements and, more particularly, to systems and methods for detecting the condition of discs of an agricultural implement based on monitored sub-surface density profiles.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more tool assemblies configured to engage the soil as the implement is moved across the field. For example, in certain configurations, the implement may include one or more disc gang assemblies, leveling disc assemblies, rolling basket assemblies, shank assemblies, and/or the like. Such tool assemblies loosen and/or otherwise agitate the soil to prepare the field for subsequent planting operations.

Due to the nature of the operation being performed within a field, the rotating discs often become damaged. For instance, contact with rocks or other objects within the field can cause a disc to become bent or even broken. Additionally, in certain instances, a disc will fall off or otherwise become decoupled from the remainder of the implement. Moreover, discs may also become plugged as soil and other field materials accumulate between adjacent discs, particularly in wet soil conditions. Such damaged, missing, and/or plugged discs can result in the operation of the agricultural implement being rendered ineffective or unsuitable for performing its intended function. However, it is typically quite difficult for an operator to determine when a disc is damaged, missing, and/or plugged, particularly during the performance of an active agricultural operation within the field.

Accordingly, a system and related method for monitoring the operating condition of discs of an agricultural implement (e.g., conditions associated with damaged, missing, and/or plugged discs) would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring disc conditions of an agricultural implement. The system includes a plurality of discs configured to penetrate through a soil surface during the performance of an agricultural operation, and a sub-surface density sensor configured to generate data associated with a density of one or more sub-surface features included within a lateral section of a field. The lateral section encompasses an expected location of a sub-surface portion of each disc of the discs. The system also includes a computing system communicatively coupled with the sub-surface density sensor. The computing system is configured to determine a sub-surface density profile extending across the lateral section of the field based on the data received from the sub-surface density sensor, and determine an operating condition of at least one disc of the plurality of discs based at least in part on the sub-surface density profile.

In another aspect, the present subject matter is directed to a method for monitoring disc conditions of an agricultural implement. The method includes receiving, with a computing system, data associated with a density of one or more sub-surface features included within a lateral section of a field. The lateral section encompasses an expected location of a sub-surface portion of each of a plurality of discs of the agricultural implement. The method also includes determining, with the computing system, a sub-surface density profile extending across the lateral section of the field based on the data received from the sub-surface density sensor, and determining, with the computing system, an operating condition of at least one disc of the plurality of discs based at least in part on the sub-surface density profile. In addition, the method includes initiating, with the computing system, a control action upon the determination of the operating condition of the at least one disc.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
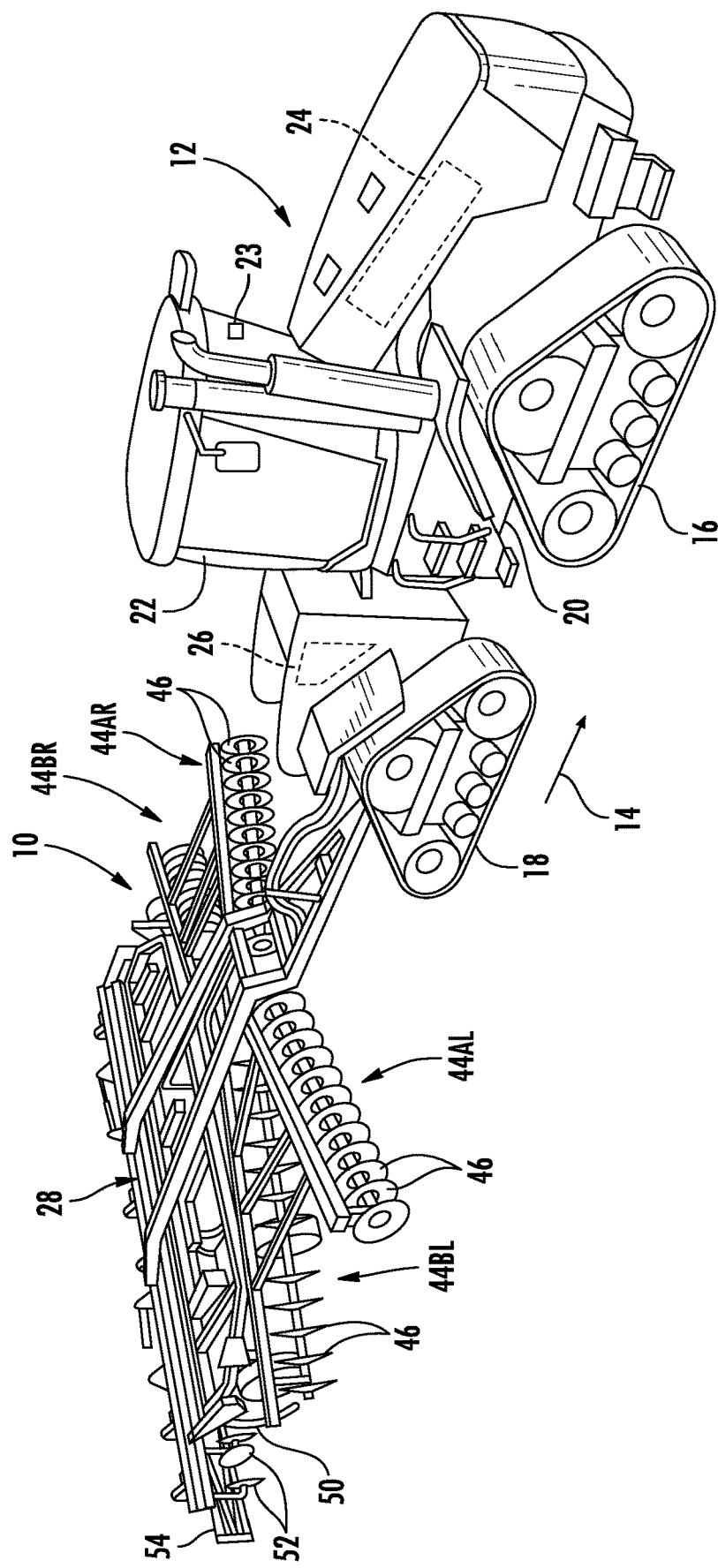
FIG. 1 illustrates a perspective view of one embodiment of an agricultural implement in accordance with aspects of the present subject matter, particularly illustrating the implement being towed by a work vehicle.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for monitoring the operating condition of discs of an agricultural implement. In several embodiments, one or more sub-surface density sensors may be supported relative to the implement such that each sensor is configured to generate data associated with a sub-surface density profile across a given lateral section of the field, with the lateral section spanning across the expected locations of sub-surface portions of one or more discs of the implement. As a result, the sub-surface density profile may encompass the density of the sub-surface portions of the discs as well as the density of the soil positioned adjacent to each disc (including the density of the soil located between adjacent discs).

A computing system may be configured to analyze the sub-surface density profile to identify the operating condition of one or more of the discs encompassed within the lateral section of the field associated with the sub-surface density profile. For instance, the sub-surface density profile may generally be characterized by high density areas corresponding to the locations of the sub-surface portions of the discs and one or more low density areas corresponding to the location(s) of the soil. As such, the computing system may be configured to identify changes in one or more of the high density areas and/or the low density area(s) (e.g., changes in the shape, dimensions, and/or profile of the high/low density areas and/or changes in the relative positions/distances between high/low density areas) to identify a damaged, missing, or plugged disc. Upon the detection of a damaged, missing, or plugged disc, the computing system may be configured to automatically initiate a control action, such as by generating an operator notification and/or by automatically adjusting the operation of the implement.

It should be appreciated that, although the present subject matter will generally be described herein with reference to discs of a disc gang assembly, the disclosed systems and methods can also be applied to individually mounted or non-ganged discs. Moreover, even though the present subject matter will generally be described herein with reference to discs of a tillage implement, the disclosed systems and methods can also be applied to discs of any other suitable agricultural implement.

Figure 2:
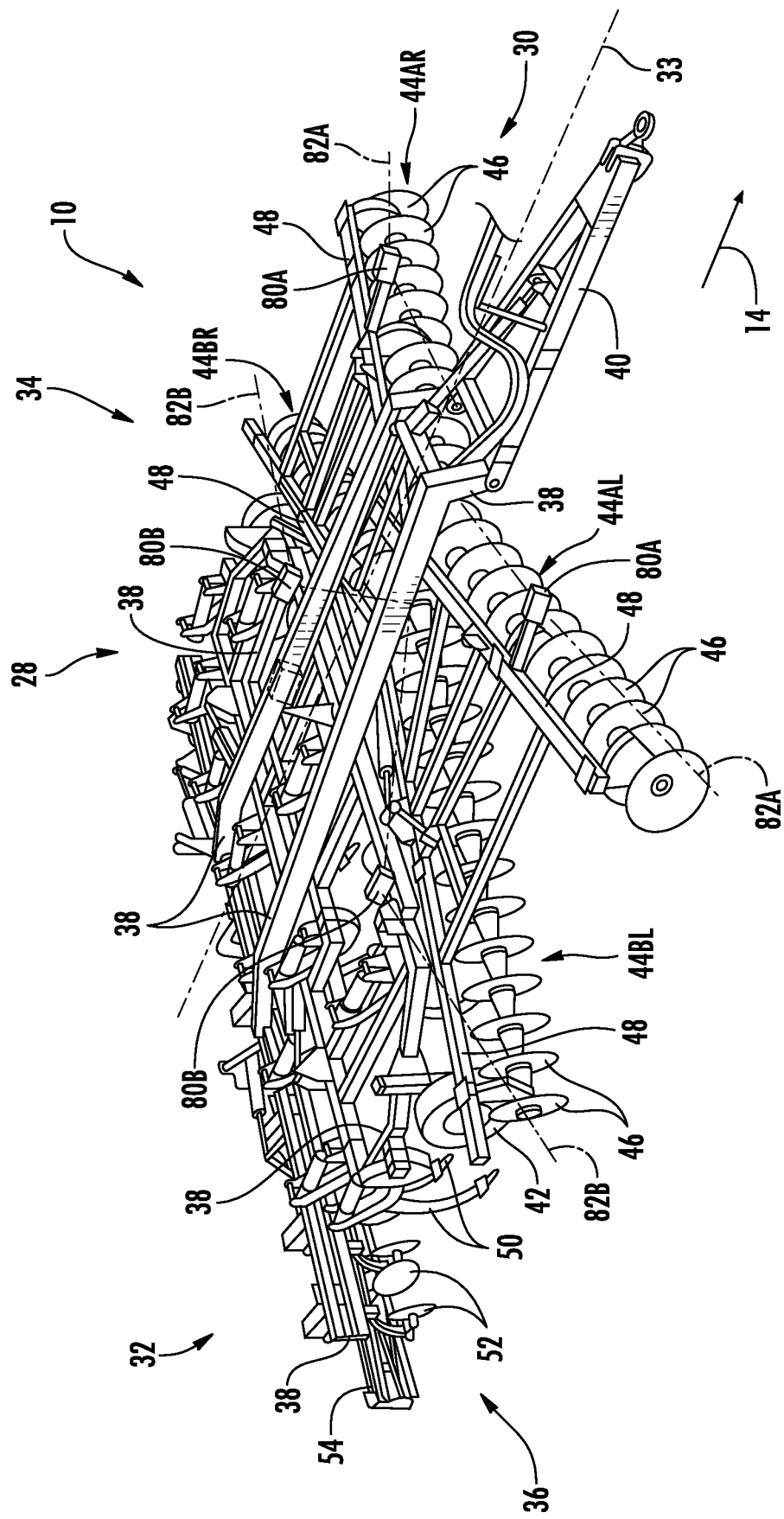
FIG. 2 illustrates another perspective view of the agricultural implement shown in FIG. 1 in accordance with aspects of the present subject matter, particularly illustrating the implement including one or more embodiments of sub-surface density sensors installed relative thereto for monitoring the density of sub-surface features within the field.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair of rear track assemblies 18, and a frame or chassis 20 coupled to and supported by the track assemblies 16, 18. Alternatively, the track assemblies 16, 18 can be replaced with tires or other suitable traction members. An operator's cab 22 may be supported by a portion of the chassis 20 and may house various input devices (e.g., a user interface 23) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend longitudinally between a forward end 30 and an aft end 32. The frame 28 may also extend laterally between a first lateral side 34 (e.g., a right side of the implement 10) and a second lateral side 36 (e.g., a left side of the implement 10), with a longitudinal centerline 33 of the implement frame 28 extending in the longitudinal direction between the forward and aft ends 30, 32 and generally dividing the first lateral side 34 from the second lateral side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, the frame 28 may be configured to support various ground-engaging tool assemblies. For instance, the frame 28 may support one or more disc gang assemblies 44. As illustrated in FIG. 2, each disc gang assembly 44 includes a toolbar 48 coupled to the implement frame 28 and a plurality of harrow discs 46 supported by the toolbar 48 relative to the implement frame 28. Each harrow disc 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported relative to the frame 28 at a location forward of the remainder of the ground-engaging tools. Specifically, the implement 10 includes a pair of front disc gang assemblies 44A (e.g., a left front disc gang assembly 44AL and a right front disc gang assembly 44AR) and a pair of rear disc gang assemblies 44B (e.g., a left rear disc gang assembly 44BL and a right rear disc gang assembly 44BR) positioned aft or rearward of the front disc gang assemblies 44A relative to the direction of travel 14 of the implement 10, with the right-side disc gang assemblies 44AR, 44BR being positioned on the right or first lateral side 34 of the implement 10 and the left-side disc gang assemblies 44AL, 44BL being positioned on the left or second lateral side 36 of the implement 10. It should be appreciated that, in alternative embodiments, the implement 10 may include any other suitable number of disc gang assemblies 44, such as more or less than four disc gang assemblies 44. Furthermore, in one embodiment, the disc gang assemblies 44 may be mounted to the frame 28 at any other suitable location, such as adjacent to its aft end 32.

Additionally, as shown, in one embodiment, the implement frame 28 may be configured to support other ground-engaging tool assemblies. For instance, in the illustrated embodiment, the frame 28 is configured to support a plurality of shank assemblies 50 configured to rip or otherwise till the soil as the implement 10 is towed across the field. Furthermore, in the illustrated embodiment, the frame 28 is also configured to support one or more finishing tool assemblies, such as a plurality of leveler disc assemblies 52 and/or rolling (or crumbler) basket assemblies 54. However, in other embodiments, any other suitable ground-engaging tool assemblies may be coupled to and supported by the implement frame 28, such as a plurality of closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration. For instance, in another embodiment, as opposed to disc gang assemblies, the discs 46 may be individually mounted or supported relative to the frame 28. Additionally, in one embodiment, the implement 10 may be configured as a disc harrow that only includes discs 46 without any additional ground-engaging tools.

Referring still to FIGS. 1 and 2, in several embodiments, the implement 10 may also include one or more sub-surface density sensors 80 supported relative thereto. Specifically, each sub-surface density sensor 80 may be configured to be supported by or relative to the frame 28 such that the sensor 80 has a field of view 82 directed towards a lateral section of the field encompassing the sub-surface portions 46A (FIG. 3) of one or more discs 46 of the implement. As a result, each sub-surface density sensor 80 may be configured to generate data associated with a sub-surface density profile of the various sub-surface features encompassed within its field of view, including the sub-surface portions 46A of the discs 46 and the soil located adjacent to and/or between the discs 46.

For instance, in the illustrated embodiment shown in FIG. 2, the implement 10 includes a pair of forward sub-surface density sensors 80A and a pair of rear sub-surface density sensors 80B. Specifically, each forward sub-surface density sensor 80A has a field of view 82A directed towards the sub-surface portions 46A of the discs 46 of a respective front disc gang assembly 44AL, 44AR, with the lateral width of each field of view 82A being equal to or greater than the lateral width of the associated front disc gang assembly 44AL, 44AR such that the forward sub-surface density sensors 80A collectively generate data associated with the sub-surface density profile across the entire lateral width of the implement encompassed by the front disc gang assemblies 44AL, 44AR. Similarly, in the illustrated embodiment, each rear sub-surface density sensor 80B has a field of view 82B directed towards the sub-surface portions 46A of the discs 46 of a respective rear disc gang assembly 44BL, 44BR, with the lateral width of each field of view 82B being equal to or greater than the lateral width of the associated rear disc gang assembly 44BL, 44BR such that the rear sub-surface density sensors 80B collectively generate data associated with the sub-surface density profile across the entire lateral width of the implement encompassed by the rear disc gang assemblies 44BL, 44BR. However, in other embodiments, the implement 10 may include any other suitable number of sub-surface density sensors defining respective fields of view having any suitable lateral width.

It should be appreciated that, in general, each sub-surface density sensor 80 may correspond to any suitable sensor or sensing device that is configured to generate data associated with the density of sub-surface features within the field. For instance, in one embodiment, each sub-surface density sensor 80 may correspond to a ground penetrating radar (GPR) configured to generate data associated with the density of sub-surface features within the field. In another embodiment, each sub-surface density sensor 80 may correspond to an electromagnetic induction (EMI) sensor configured to generate data associated with the density of the sub-surface features within the field. Alternatively, each sub-surface density sensor 80 may correspond to any other suitable sensor or sensing device configured to generate data that is directly or indirectly related to the density of the sub-surface within the field.

Figure 3:
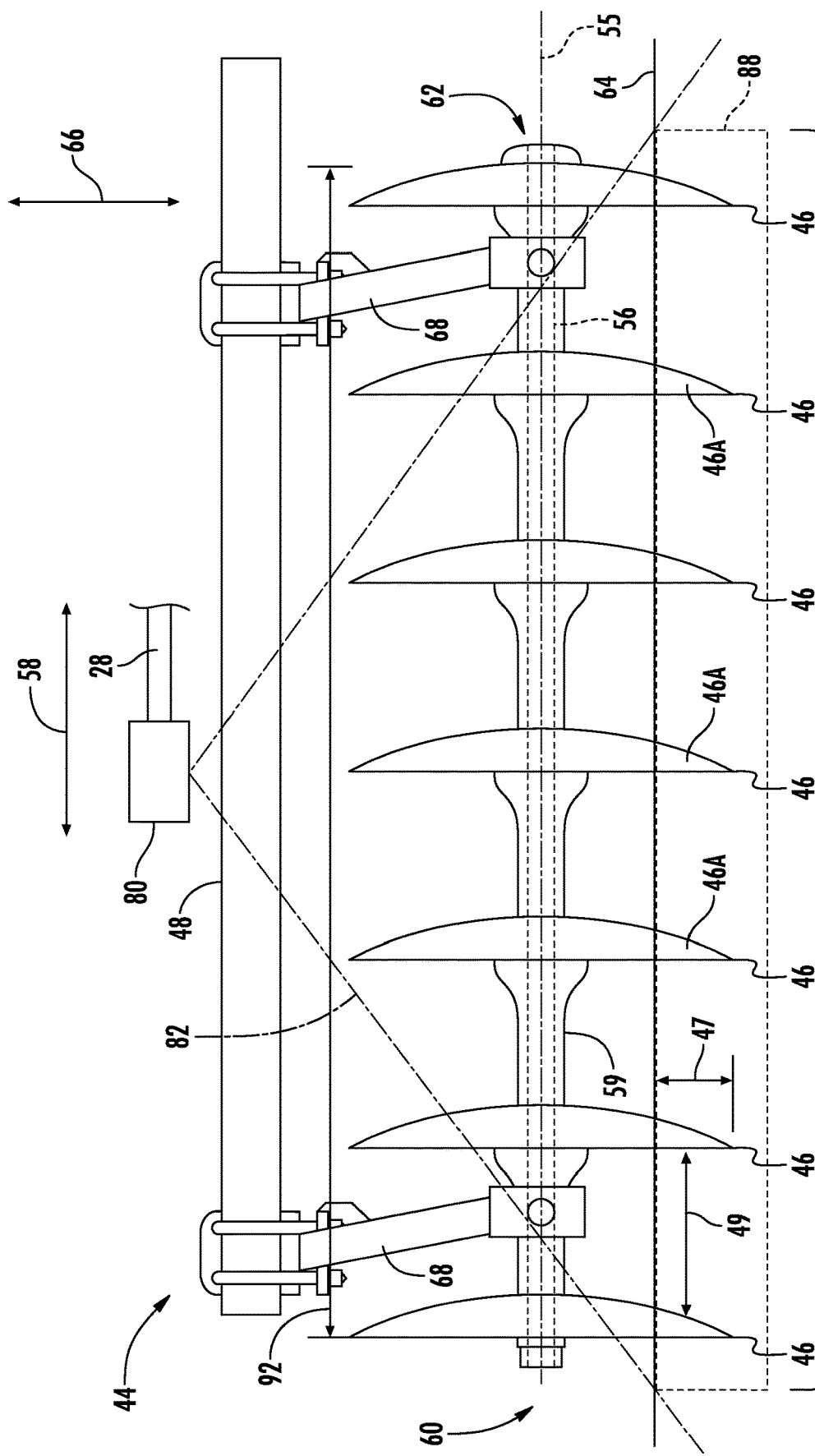
FIG. 3 illustrates a font view of one of the disc gang assemblies of the implement shown in FIGS. 1 and 2, particularly illustrating an exemplary lateral field of view of one embodiment of a sub-surface density sensor in accordance with aspects of the present subject matter.

Referring now to FIG. 3, a front view of one of the disc gang assemblies 44 described above with reference to FIGS. 1 and 2 is illustrated in accordance with aspects of the present subject matter. As shown in FIG. 3, the disc gang assembly 44 may include a disc gang shaft (e.g., as indicated with dashed lines 56) that extends along an axial direction of the disc gang assembly 44 (e.g., as indicated by arrow 58) between a first end 60 and a second end 62. The disc gang shaft 56 may be positioned below the toolbar 48 of the disc gang assembly 44 along a vertical direction (e.g., as indicated by arrow 66) of the implement 10 and supported relative to the toolbar 48 by one or more hangers 68. However, in alternative embodiments, the disc gang shaft 56 may have any other suitable orientation. Each disc 46 may be rotatably coupled or keyed to the disc gang shaft 56. The disc gang shaft 56 defines a rotational axis (e.g., as indicated by dashed line 55) about which the discs 46 rotate. Each disc 46 may be spaced apart from an adjacent disc 46 in the axial direction 58 via spools 59.

As is generally understood, the discs 46 may be configured to penetrate through a soil surface 64 of the field and cut into the soil during the performance of an agricultural operation. As a result, each disc 46 may generally have a sub-surface portion 46A extending below the soil surface 64 to a given disc depth 47 corresponding to the penetration depth of the disc 46. Additionally, given the lateral spacing of the discs 46 across the disc gang assembly 44, the sub-surface portions 46A of adjacent discs 46 may generally be spaced apart from each other by a lateral spacing distance 49 during normal conditions.

Additionally, FIG. 3 also illustrates one of the sub-surface density sensors 80 described above as supported relative to the disc gang assembly 44. Specifically, as shown schematically in the illustrated embodiment, the sub-surface density sensor 80 is supported relative to the disc gang assembly 44 via a portion of the implement frame 28 such that the sensor 82 has a field of view 82 directed towards a lateral section 88 of the field encompassing all or portion of the sub-surface portions 46A of the discs 46. In one embodiment, the field of view 82 may be selected such that the lateral section 88 defines a lateral width 90 that is equal to or greater than a lateral width 92 defined across the discs 46 of the disc gang assembly 44, thereby allowing the sensor 80 to generate data associated with the sub-surface density profile across the entire width of the disc assembly 44. In such an embodiment, the density data provided by the sensor 80 may be analyzed to determine the operating condition of each individual disc 46 of the disc gang assembly 44. However, in other embodiments, the lateral section 88 may define any other suitable lateral width 90, such as a lateral width that only encompasses a portion of the discs 44 of the disc gang assembly 44.

By capturing sub-surface density data across the lateral section 88 of the field, the data may be used to generate a sub-surface density profile of the various sub-surface features encompassed therein, including the sub-surface portions 46A of the discs 46 and the adjacent portions of the soil. As will be described in greater detail below with reference to FIGS. 4 and 5A-5C, the sub-surface density profile may be analyzed to identify or infer the operating condition of each respective disc 46 encompassed within the lateral section 88. Specifically, when the discs 46 are operating normally (i.e., when the discs 46 are not damaged, missing, or plugged), it is generally expected that a baseline sub-surface density profile will be defined across the lateral section 88 of the field that includes both high-density areas (e.g., at the expected locations of the sub-surface portions 46A of the discs 46) and low density areas (e.g., at the locations of the soil). As a result, by establishing a baseline sub-surface density profile that defines the expected shapes, profiles, dimensions, and/or relative positioning of the high density areas and the low density areas, it may be determined when disc is damaged (e.g., bent or broken), missing, or plugged.

For instance, the baseline sub-surface density profile may be characterized by: (1) high density areas (e.g., at the locations of the sub-surface portions 46A of the discs 46) that: (a) extend below the soil surface by a given distance (e.g., depth 47); (b) are spaced apart from one another by a given lateral spacing (e.g., spacing distance 49); and/or (c) define an expected shape or profile; and/or (2) low density areas (e.g., at the locations of the soil positioned between adjacent discs 46) that have a density within a given threshold density range that is lower than the density of the discs 46. However, when a disc 46 is damaged (e.g., bent or broken), missing, or plugged, the sub-surface density profile in the area of such disc 46 will generally vary from the baseline sub-surface density profile. For instance, when a disc bends or breaks, the penetration depth of the sub-surface portion 46A of the disc 46 will decrease relative to the expected depth 47 as the damaged portion of the disc 46 passes through the soil and/or the lateral spacing between the damaged disc and an adjacent disc 46 will increase or decrease relative to the expected lateral spacing 49 as the damaged portion of the disc 46 passes through the soil, thereby resulting in a variation in the sub-surface density profile in the area of the damaged disc. Similarly, when a disc is missing, the lower density material (e.g., soil) will be positioned at the expected location of the disc. Moreover, when a disc is plugged, the density of the soil adjacent to the disc will exceed the normal or expected density range for the soil (e.g., by exceeding a maximum density threshold associated with the expected soil density range), thereby resulting in a variation in the sub-surface density profile in the area of the plugged disc.

Figure 4:
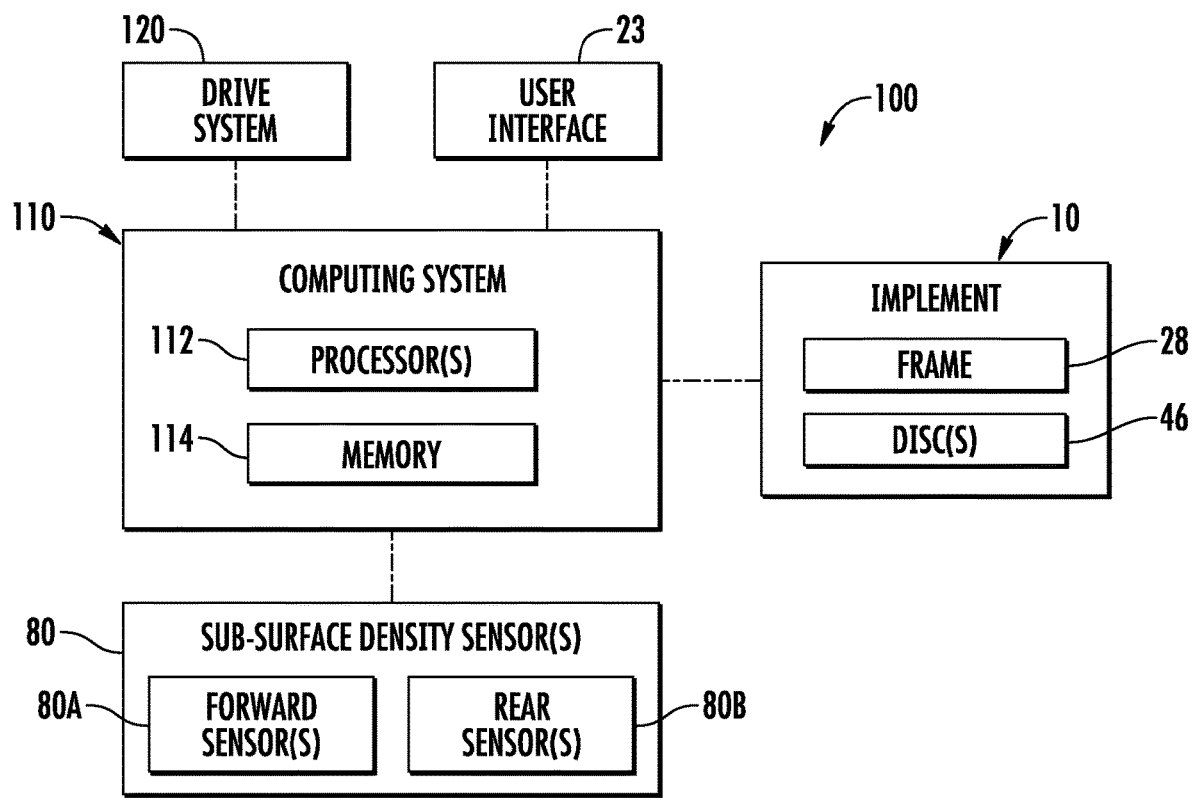
FIG. 4 illustrates a schematic view of one embodiment of a system for monitoring disc conditions of an agricultural implement in accordance with aspects of the present subject matter.

Referring now to FIG. 4, a schematic view of one embodiment of a system 100 for monitoring the disc conditions of an agricultural implement is illustrated in accordance with aspects of the present subject matter. In general, the system 100 will be described herein with reference to the implement 10 and related discs 46 described above with reference to FIGS. 1-3. However, it should be appreciated by those of ordinary skill in the art that the disclosed system 100 may generally be utilized with agricultural implements having any other suitable implement configuration and/or with discs having any other suitable disc configuration (including individually mounted or non-ganged discs).

In general, the system 100 may include an agricultural implement and/or one or more components of an agricultural implement, such as the agricultural implement 10 described above and/or one or more of its components. For example, as shown in FIG. 4, the system 100 may include one or more discs 46 configured to be supported relative to a frame 28 of the implement 10, such as the discs 46 of one or more of the front disc gang assemblies 44AL, 44AR and/or one or more of the rear disc gang assemblies 44BL, 44BR of the implement 10 described above. Additionally, the system 100 may include one or more sub-surface density sensors 80 configured to generate data indicative of the density of one or more sub-surface features within the field. For instance, as described above, the system 100 may, in one embodiment, may include one or more forward sub-surface density sensors 80A configured to generate data associated with the density of the soil and adjacent sub-surface portions 46A of the discs 46 of one or more of the front disc gang assemblies 44AL, 44AR and one or more rear sub-surface density sensors 80B configured to generate data associated with the density of the soil and adjacent sub-surface portions 46A of the discs 46 of one or more of the rear disc gang assemblies 44BL, 44BR.

In accordance with aspects of the present subject matter, the system 100 may also include a computing system 110 configured to execute various computer-implemented functions. In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like.

It should be appreciated that the computing system 110 may correspond to an existing computing system of the implement 10 or associated work vehicle 12 or the computing system 110 may correspond to a separate computing system. For instance, in one embodiment, the computing system 110 may form all or part of a separate plug-in module that may be installed in association with the implement 10 or work vehicle 12 to allow for the disclosed system 100 and related methods to be implemented without requiring additional software to be uploaded onto existing computing systems of the implement 10 and/or the work vehicle 12.

In several embodiments, the computing system 110 may be configured to monitor the density of the sub-surface features within the field based on the data received from the sub-surface density sensor(s) 80. Specifically, in one embodiment, the computing system 110 may be communicatively coupled to the sub-surface density sensor(s) 80 (e.g., via a wired or wireless connection) to allow the density-related data associated with the measured densities of the sub-surface features included within the sensor's field of view 82 (e.g., the sub-surface features associated with a given lateral section of the field, such as lateral section 88 (FIG. 3)) to be transmitted to the computing system 110, including density data associated with both the sub-surface portions 46A of the discs 46 and the surrounding soil included within the sensor's field of view 82. The density data received from the sensor(s) 80 may be used by the computing system 110 to monitor a sub-surface density profile across the lateral section of the field encompassed by the sensor's field of view, which may then be analyzed to infer or identify an operating condition of one or more of the discs 46 that are or should be located within the lateral section of the field. Specifically, as indicated above, the sub-surface density profile may be analyzed to determine when a given disc(s) 46 is damaged (broken or bent), plugged, or is completely missing from its expected location.

Figure 5A:
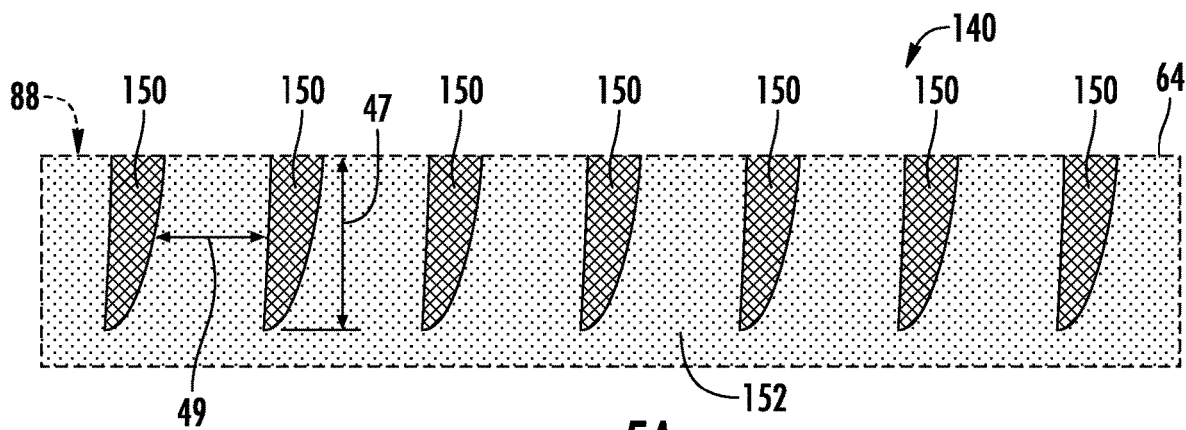
FIG. 5A illustrates an example sub-surface density profile generated based on sub-surface density data collected across a given lateral section of a field, particularly illustrating a sub-surface density profile representative of a baseline surface density profile for discs having normal or expected operating conditions.
Figure 5B:
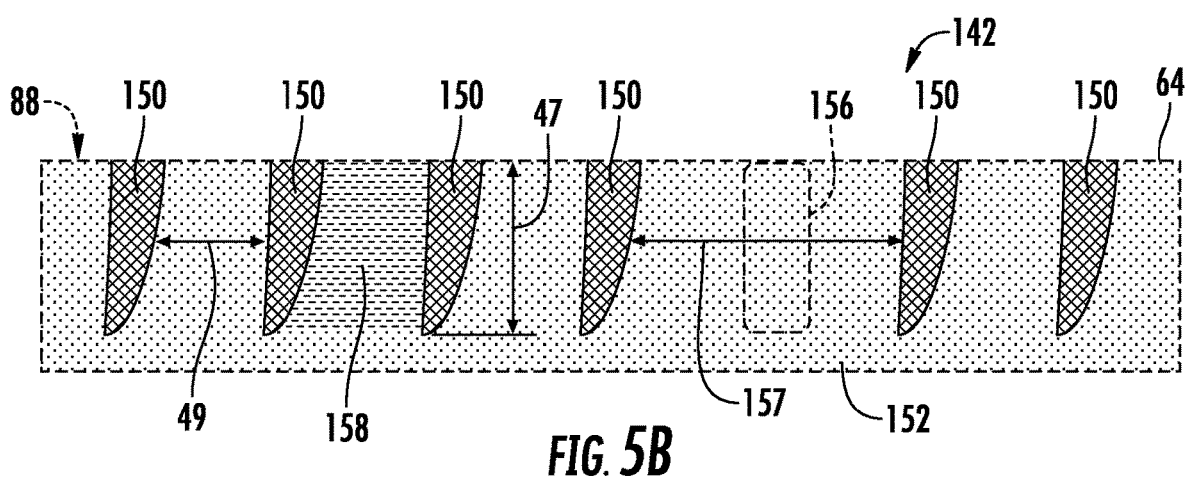
FIG. 5B illustrates another example sub-surface density profile generated based on sub-surface density data collected across a given lateral section of a field, particularly illustrating a sub-surface density profile representative of one of the discs being missing and one or more of the discs being plugged.
Figure 5C:
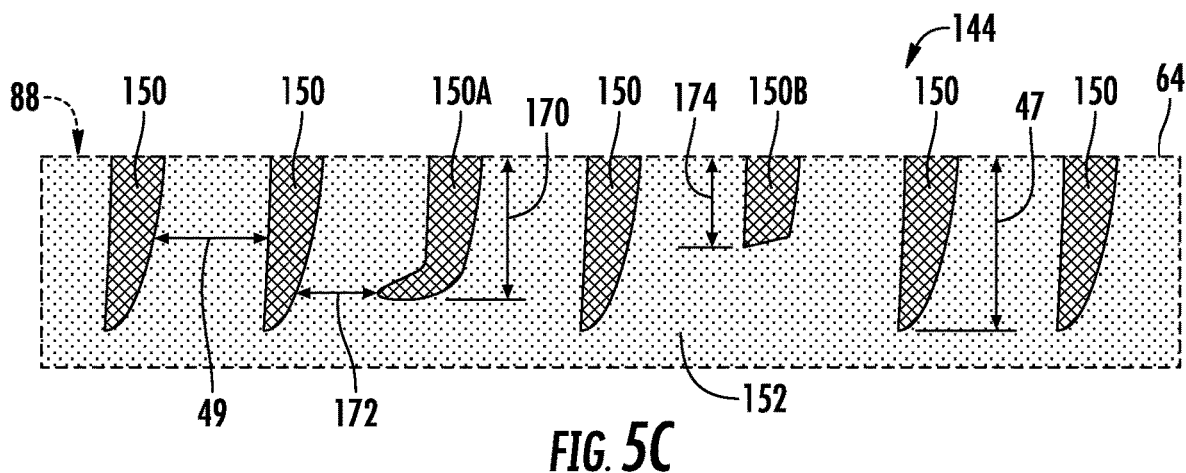
FIG. 5C illustrates another example sub-surface density profile generated based on sub-surface density data collected across a given lateral section of a field, particularly illustrating a sub-surface density profile representative of two of the discs being damaged.

For instance, FIGS. 5A-5C illustrate example sub-surface density profiles generated based on sub-surface density data collected across a given lateral section of a field, particularly illustrating a sub-surface density profile 140 (FIG. 5A) representative of a baseline surface density profile 140 for discs 46 having normal or expected operating conditions, a sub-surface density profile 142 (FIG. 5B) representative of one of the discs 46 being missing and one or more of the discs 46 being plugged, and a sub-surface density profile 144 (FIG. 5C) representative of two of the discs 46 being damaged. It should be appreciated that, for purposes of illustration, the lateral section of the field across which each sub-surface density profile 140, 142, 144 is mapped generally corresponds to the lateral section 88 of the field described above with reference to FIG. 3 and, thus, encompasses the expected locations of a plurality of discs 46.

As shown in FIG. 5A, during normal operating conditions, the sub-surface density profile 140 across the lateral section 88 of the field will generally be characterized by a plurality of high density areas 150 corresponding to the locations of the sub-surface portions 46A of the discs (see FIG. 3) and one or more low density areas 152 corresponding to the locations of the lower density soil, with the shapes, profiles, dimensions, and/or relative positioning of the high density areas 150 and low density area(s) 152 corresponding to expected or anticipated shapes, profiles, dimensions, and/or relative positionings of such high/low density areas 150, 152. For instance, as shown in FIG. 5A, each high density area 150 extends to a depth 47 below the soil surface 64 correspond to the penetration depth 47 (FIG. 3) of the sub-surface portions 46A of the discs 46. Additionally, adjacent high density areas 150 are spaced apart laterally by a distance 49 corresponding to the expected lateral spacing 49 (FIG. 3) between the sub-surface portions 46A of adjacent discs 46.

In contrast, as shown in FIG. 5B, when a disc is missing, the sub-surface density profile 142 will vary from the expected or baseline sub-surface density profile 140 of FIG. 5A. Specifically, as opposed to a high density area 150, the expected location of the missing disc 46 (e.g., as indicated by dashed box 156 in FIG. 5B) is characterized by a low density area 152. For instance, the expected location 156 of the disc will typically be filled or occupied by lower density soil, thereby allowing the missing disc 46 to be easily identified. Additionally, the lateral spacing between adjacent high density areas 150 will be significantly increased in the area of the missing disc 46. For instance, as shown in FIG. 5B, a lateral spacing 157 that is equal to approximately double the expected lateral spacing 49 is defined between adjacent high density areas 150 across the area of the missing disc 46.

Additionally, when one or more discs 46 are plugged, the sub-surface density profile 142 will vary from the expected or baseline sub-surface density profile 140 of FIG. 5A. Specifically, in several embodiments, the soil adjacent to such disc(s) 46 will generally exhibit an increased density relative to the remainder of the soil. For instance, as shown in FIG. 5B, an area of increased density 158 is positioned directly between two high density areas 150 that has a density value that is higher than the density value associated with the low density area 152 (e.g., the density of the surrounding soil) and less than the density value associated with the high density areas 150 (e.g., the density of the disc material). In such instance, it may be determined that the area of increased density 158 corresponds to higher density soil and/or other field materials that have accumulated between the discs 46 corresponding to the adjacent high density areas 150, thereby indicating that such discs 46 are currently plugged or experienced a plugged condition.

Moreover, as shown in FIG. 5C, when a disc is damaged (e.g., bent or broken), the sub-surface density profile 144 will vary from the expected or baseline sub-surface density profile 140 of FIG. 5A. Specifically, with a bent or broken disc, the shapes, profiles, dimensions, and/or relative positioning of the high/low density areas 150, 152 will generally vary as compared to the baseline sub-surface density profile 140 of FIG. 5A. For instance, as shown in the illustrated embodiment, high density area 150A provides an example of an indication of a bent portion of a disc 46. Specifically, the high density area 150A has a shape or profile that differs from the shape or profile of the normal high density areas 150, particularly having a bent shape or profile exhibiting a reduced depth 170 relative to the soil surface 64 as compared to the expected depth 47. Moreover, the bent nature of the disc 46 results in the relative positioning between the associated high density area 150A and the adjacent high density areas 150 being different than expected. For instance, as shown in FIG. 5C, the lateral spacing 172 between the high density area 150A and an adjacent high density area 150 is reduced relative to the expected lateral spacing 49.

Additionally, high density area 150B provides an example of an indication of a broken portion of a disc 46. Specifically, the high density area 150B has a shape or profile that differs from the shape or profile of the normal high density areas 150, particularly having a shortened profile exhibiting a reduced depth 174 relative to the soil surface 64 as compared to the expected depth 47. Moreover, the broken nature of the disc 46 results in an increase in the low density area 152 surrounding the high density area 150B Referring back to FIG. 4, as indicated above, the computing system 110 may be configured to monitor the sub-surface density profile of the associated lateral section of the field contained within the sensor's field of view to identify when one or more of the discs 46 is damaged, plugged, or missing. Moreover, when it is determined that a given disc 46 is damaged, plugged, or missing, the computing system 110 may be configured to automatically initiate one or more control actions. For example, the computing system 110 may be configured to provide the operator with a notification that a given disc 46 is damaged, plugged, or missing. Specifically, in one embodiment, the computing system 110 may be communicatively coupled to the user interface 23 of the work vehicle 12 via a wired or wireless connection to allow notification signals to be transmitted from the computing system 100 to the user interface 23. In such an embodiment, the notification signals may cause the user interface 23 to present a notification to the operator (e.g., by causing a visual or audible notification or indicator to be presented to the operator) which provides an indication of the operational status of the disc 46 (e.g., as damaged, plugged, or missing). In such instance, the operator may then choose to initiate any suitable corrective action he/she believes is necessary, such as adjusting the ground speed of the implement 10 (including bringing the implement to a stop).

Additionally, in several embodiments, the control action(s) executed by the computing system 110 may include automatically adjusting the operation of the implement 10 and/or the associated work vehicle 12. For instance, in one embodiment, the computing system 110 may be configured to automatically adjust the ground speed of the implement 10 in response to determining that a disc 46 is damaged, plugged, or missing, such as by actively controlling a drive system 120 of the work vehicle 12 (e.g., the engine 24 and/or the transmission 26 of the work vehicle 12) to safely bring the vehicle/implement to a stop. In another embodiment, the computing system 110 may be configured to adjust the penetration depth of the discs 46.

Figure 6:
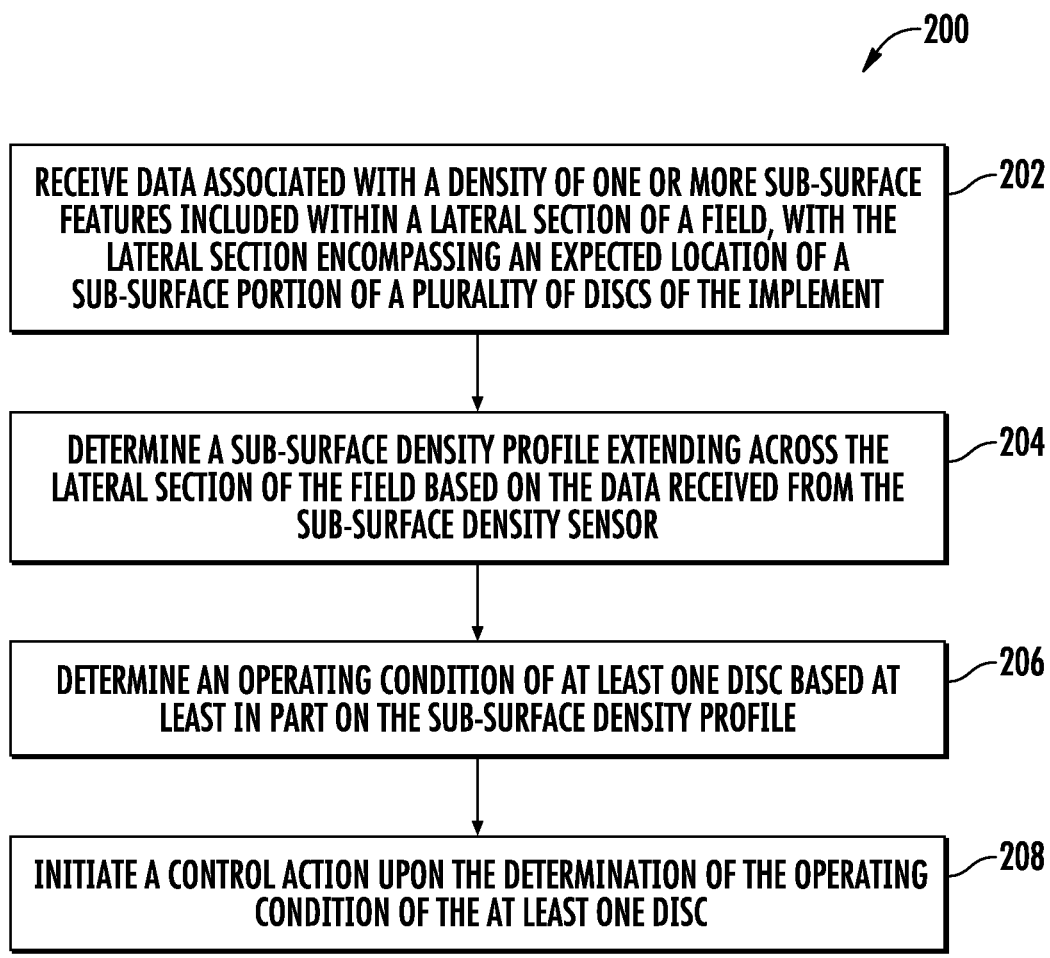
FIG. 6 illustrates a flow diagram of one embodiment of a method for monitoring disc conditions of an agricultural implement in accordance with aspects of the present subject matter.

Referring now to FIG. 6, a flow diagram of one embodiment of a method 200 for monitoring disc conditions of an agricultural implement is illustrated in accordance with aspects of the present subject matter. In general, the method 200 will be described herein with reference to the agricultural implement 10, discs 46, and system 100 described above with reference to FIGS. 1-4. However, it should be appreciated by those of ordinary skill in the art that the disclosed method 200 may generally be utilized in association with agricultural implements having any suitable implement configuration, discs having any other suitable disc configuration, and/or systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving data associated with a density of one or more sub-surface features included within a lateral section of a field, with the lateral section encompassing an expected location of a sub-surface portion of each of a plurality of discs of the agricultural implement. For instance, as indicated above, the computing system 110 may be communicatively coupled to one or more associated sub-surface density sensors 80, thereby allowing the computing system 110 to receive data associated with the density of the one or more sub-surface features within the field.

Additionally, at (204), the method 200 may include determining a sub-surface density profile extending across the lateral section of the field based on the data received from the sub-surface density sensor. For instance, as indicated above, the computing system 110 may be configured to map or analyze the sub-surface density data received from the sensor(s) 80 to generate a sub-surface density profile for the lateral section of the field encompassed within the sensor's field of view.

Moreover, at (206), the method 200 may include determining an operating condition of at least one disc of the plurality of discs based at least in part on the sub-surface density profile. Specifically, as indicated above, the computing system 110 may be configured to analyze the sub-surface density profile to determine when a given disc is damaged, plugged, or missing. For instance, in one embodiment, the computing system 110 may be configured to compare the sub-surface density profile to an expected or baseline surface density profile associated with a normal operating condition for the discs. In such an embodiment, by identifying differences or variations between the sub-surface density profile and the baseline surface density profile, the computing system 110 may determine when a disc is damaged, plugged, or missing.

Referring still to FIG. 6, at (208), the method 200 may include initiating a control action upon the determination of the operating condition of the at least one disc. For instance, as indicated above, upon the detection of a damaged, plugged, or missing disc, the computing system 110 may be configured to initiate a control action. Specifically, in one embodiment, the computing system 110 may be configured to generate an operator notification, such as by provide an alert to the operator via the user interface 23 of the associated work vehicle 12. In another embodiment, the computing system 110 may be configured to automatically adjusting the operation of the implement 10, such as by reducing the speed of the implement 10 (including stopping the implement 10) or by varying the penetration depth of the discs 46.

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring disc conditions of an agricultural implement, the system comprising:
   a plurality of discs configured to penetrate through a soil surface during the performance of an agricultural operation;
   a sub-surface density sensor configured to generate data associated with a density of one or more sub-surface features included within a field of view of the sub-surface density sensor extending across a lateral section of a field, the field of view of the sub-surface density sensor encompassing an expected location of a sub-surface portion of each disc of the plurality of discs such that the data generated by the sub-surface density sensor includes density data associated with the density of the sub-surface portion of each disc of the plurality of discs located within the field of view; and
   a computing system communicatively coupled with the sub-surface density sensor, the computing system being configured to:
      determine a sub-surface density profile extending across the lateral section of the field based on the data received from the sub-surface density sensor; and
      determine an operating condition of at least one disc of the plurality of discs based at least in part on the sub-surface density profile, the operating condition being indicative of the at least one disc being damaged or missing.

2. The system of claim 1, wherein the computing system is configured to compare the sub-surface density profile to a baseline sub-surface density profile and determine the operating condition of the at least one disc based at least in part on the comparison between the sub-surface density profile and the baseline sub-surface density profile.

3. The system of claim 2, wherein the computing system is configured to determine that the at least one disc is damaged or missing based on one or more identified differences between the sub-surface density profile and the baseline sub-surface density profile.

4. The system of claim 1, wherein the sub-surface portion of each of the plurality of discs corresponds to a high density area within the sub-surface density profile and soil corresponds to a low density area within the sub-surface density profile.

5. The system of claim 4, wherein the computing system is configured to determine that the at least one disc is damaged based on an identified change in at least one of a respective high density area associated with the at least one disc or the low density area adjacent to the respective high density area within the sub-surface density profile.

6. The system of claim 1, wherein the computing system is configured to determine that the at least one disc is missing when the sub-surface density profile indicates that a low density material is located at the expected location of the sub-surface portion of the at least one disc, the low density material having a lower density than the at least one disc.

7. The system of claim 1, wherein the computing system is further configured to initiate a control action upon the determination of the operating condition of the at least one disc.

8. The system of claim 7, wherein the control action comprises one of generating an operator notification or adjusting an operation of the agricultural implement.

9. The system of claim 1, wherein the soil density sensor comprises one of a ground-penetrating radar (GPR) or an electromagnetic induction (EMI) sensor.

10. A method for monitoring disc conditions of an agricultural implement, the method comprising:
    receiving, with a computing system, data from a sub-surface density sensor associated with a density of one or more sub-surface features included within a field of view of the sub-surface density sensor extending across a lateral section of a field, the field of view of the sub-surface density sensor encompassing an expected location of a sub-surface portion of each of a plurality of discs of the agricultural implement such that the data generated by the sub-surface density sensor includes density data associated with the density of the sub-surface portion of each disc of the plurality of discs located within the field of view;
    determining, with the computing system, a sub-surface density profile extending across the lateral section of the field based on the data received from the sub-surface density sensor;
    determining, with the computing system, an operating condition of at least one disc of the plurality of discs based at least in part on the sub-surface density profile, the operating condition being indicative of the at least one disc being damaged or missing; and
    initiating, with the computing system, a control action upon the determination of the operating condition of the at least one disc.

11. The method of claim 10, further comprising comparing the sub-surface density profile to a baseline sub-surface density profile, wherein determining the operating condition of the at least one disc comprises determining the operating condition of the at least one disc based at least in part on the comparison between the sub-surface density profile and the baseline sub-surface density profile.

12. The method of claim 11, wherein determining the operating condition of the at least one disc comprises determining that the at least one disc is damaged or missing based on one or more identified differences between the sub-surface density profile and the baseline sub-surface density profile.

13. The method of claim 10, wherein the sub-surface portion of each of the plurality of discs corresponds to a high density area within the sub-surface density profile and soil corresponds to a low density area within the sub-surface density profile.

14. The method of claim 13, wherein determining the operating condition of the at least one disc comprises determining that the at least one disc is damaged based on an identified change in at least one of a respective high density area associated with the at least one disc or the low density area adjacent to the respective high density area within the sub-surface density profile.

15. The method of claim 10, wherein determining the operating condition of the at least one disc comprises determining that the at least one disc is missing when the sub-surface density profile indicates that a low density material is located at the expected location of the sub-surface portion of the at least one disc, the low density material having a lower density than the at least one disc.

16. The method of claim 10, wherein initiating the control action comprises generating a notification for an operator of the agricultural implement.

17. The method of claim 10, wherein initiating the control action comprises adjusting an operation of the agricultural implement.

18. The method of claim 10, wherein the soil density sensor comprises one of a ground-penetrating radar (GPR) or an electromagnetic induction (EMI) sensor.

* * * * *